May 12, 1925. 1,537,583
G. C. CARHART
GEAR LAPPING MACHINE
Filed March 7, 1923 3 Sheets-Sheet 3

George C. Carhart, INVENTOR.
BY
Parsons & Bodell, ATTORNEYS.

Patented May 12, 1925.

1,537,583

UNITED STATES PATENT OFFICE.

GEORGE C. CARHART, OF SYRACUSE, NEW YORK, ASSIGNOR TO BROWN-LIPE GEAR COMPANY, OF SYRACUSE, NEW YORK, A CORPORATION OF NEW YORK.

GEAR-LAPPING MACHINE.

Application filed March 7, 1923. Serial No. 623,590.

*To all whom it may concern:*

Be it known that I, GEORGE C. CARHART, a citizen of the United States, residing at Syracuse, in the county of Onondaga and State of New York, have invented a certain new and useful Gear-Lapping Machine, of which the following is a specification.

This invention has for its object a gear lapping machine, which is particularly simple in construction and highly efficient and rapid in operation and by which the lapping and the changing of position of the gears is effected by a minimum number of relative movements of the gears and the rack on which they are lapped.

The invention consists in the novel features, and in the combinations and constructions hereinafter set forth and claimed.

In describing this invention, reference is had to the accompanying drawings, in which like characters designate corresponding parts in all the views.

Figure 1:
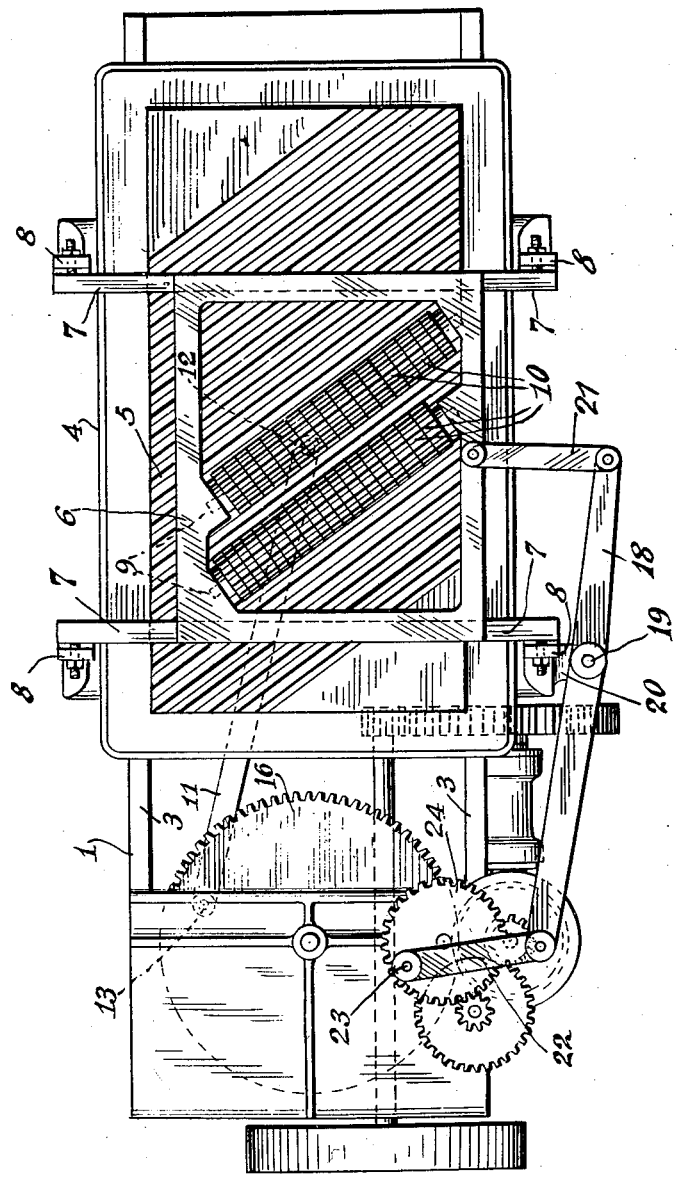
Figure 1 is a plan view of this machine.
Figure 2:
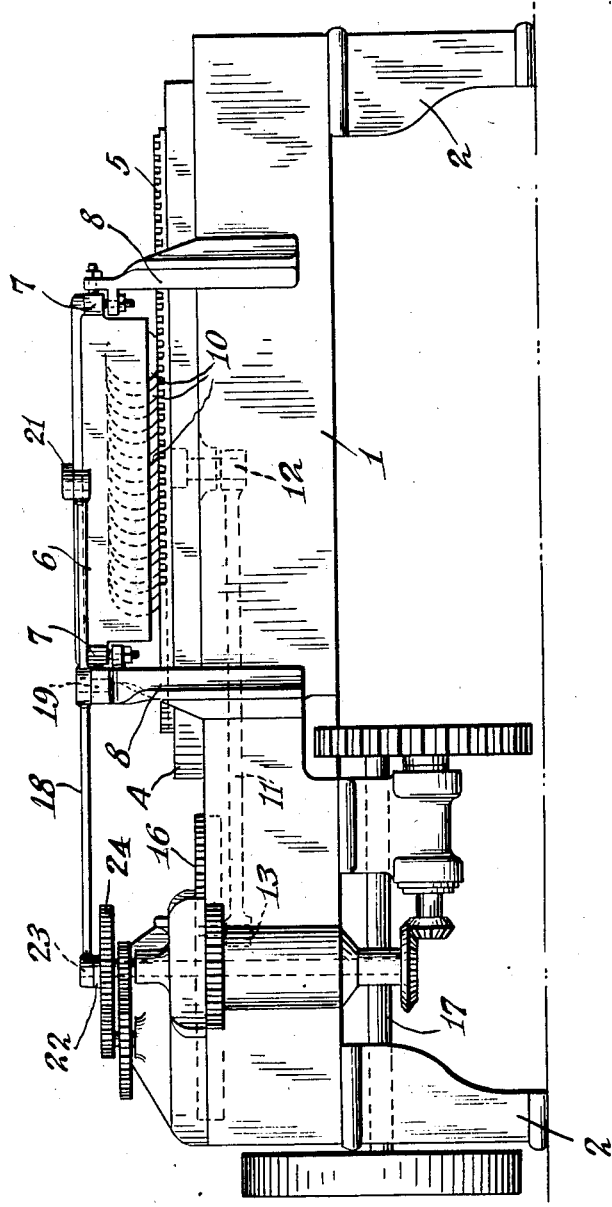
Figures 2 and 3 are side and end elevations thereof.
Figure 3:
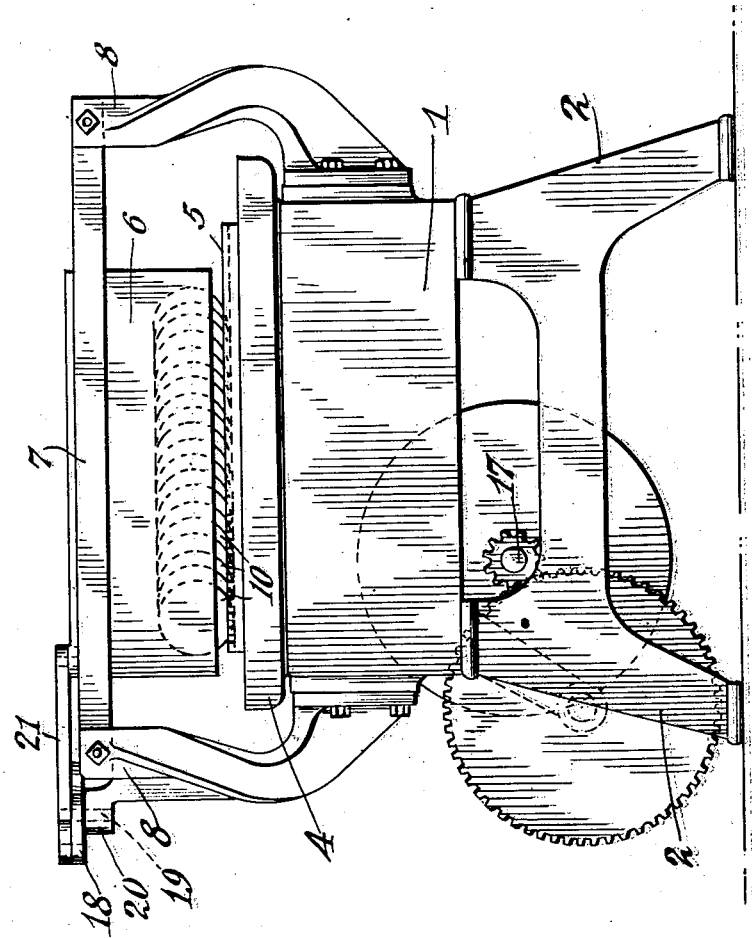

This gear lapping machine comprises a rack and gear carriage for the gear in mesh with the rack and means for effecting relative movement of the rack and the gear carriage in a direction at an inclined angle to the teeth of the rack and axis of the gear and also preferably a relative movement in a direction at an inclined angle to the teeth of the rack and at an angle to the former relative movement, to roll or change the position or path of the gears relatively to the rack, in addition to a rolling movement effected by any former relative movement, so that the gears are rolled by the latter relative movement in addition to the movement about their axis effected by the former relative movement. The former relative movement is for convenience considered as lengthwise of the rack and the latter as crosswise of the rack.

The relative movements may be effected by feeding the gear carriage along, or lengthwise of the rack and the gear carriage moved transversely of the rack, the teeth of which are inclined relatively to the directions of both of said movements; or by moving the rack lengthwise and the gear carriage transversely of the rack, the teeth of the rack being inclined relatively to the direction of both movements.

In the illustrated embodiment of my invention, the rack as shown is movable lengthwise.

1 designates the frame, or bed of the machine and said frame or bed may be of any suitable form, size and construction, it being supported on legs 2 and formed with horizontal guides or ways 3. 4 is the rack carriage on which the rack 5 is mounted, said carriage being movable along the ways 3. 6 is the gear carriage movable transversely of the rack 5, along guides 7 extending above the rack and supported by brackets 8 extending upwardly from opposite sides of the frame.

The teeth of the rack extend at an inclined or oblique angle relatively to the direction of movement of the rack and to the transverse movement of the gear carriage. The gear carriage 6 is here illustrated as in the form of a rectangular frame and is provided with suitable means to receive arbors 9 on which the gears 10 are mounted, or to receive supports for bearings for the stems of stem gears with the gears in mesh with the rack.

As the teeth of the rack 5 are inclined with respect to the direction of movement of the gear carriage, the bearings are arranged to hold the gears with their axes inclined relatively to the gear carriage and parallel to the inclination of the teeth of the rack. The movement of the gear carriage transversely of the rack may be continuous or intermittent, and is usually a slow continuous reciprocating movement.

In operation, the lapping is effected by a relative movement of the rack and gear carriage in a direction lengthwise of the rack and the relative transverse movement of the rack and gear carriage effecting the changes of position in the gears relatively to the rack so that the teeth in mesh with the rack change to engage other teeth portions of the rack or traverse other paths, and hence undue or uneven wear on the rack teeth is avoided.

Any suitable means for actuating the rack carriage 4 and the gear carriage 6 may be used.

The means for actuating the rack carriage is here shown as comprising a connecting rod or pitman 11 pivoted at one end at 12 to the rack carriage 4 centrally of the under side thereof and at its other end to a crank or wrist pin 13 on the rotary element or wheel 16 which in turn is connected through suitable mechanism unnecessary to describe to a main driving shaft 17; and the gear carriage 6 being here shown as movable transversely of the rack carriage 4 by the lever 18 pivoted between its ends at 19 to a bracket 20 at one side of the frame and connected at one end by a link 21 to a gear carriage centrally thereof and having a link 22 pivoted to its other end, which link is mounted on the crank or wrist pin 23 on the rotatable element as a gear 24 connected through suitable power transmitting mechanism, unnecessary to described, to the main drive shaft. The main drive shaft is connectible to, and disconnectible from, a source of power in any well-known manner.

In operation, during the "lengthwise" movement of the rack the lapping operations are performed owing to the inclined rack teeth and during the "transverse" movement of the gear carriage, the position of the gear is changed so that the gear is rolled into another path on the rack, in addition to the motion about their axes effected by the movement of the rack.

What I claim is:

1. In a gear lapping machine, the combination of a rack, a gear carriage constructed to rollably mount an unlapped gear in mesh with the rack and means for effecting relative movement of the rack and the gear carriage in a direction lengthwise of the rack, the teeth of the rack being arranged at an inclined angle to the direction of such relative movement, substantially as and for the purpose described.

2. In a gear lapping machine, the combination of a rack, a gear carriage constructed to rollably mount an unlapped gear in mesh with the rack, means for effecting relative movement of the rack and the gear carriage in a direction lengthwise of the rack, the teeth of the rack being arranged at an inclined angle to the direction of such relative movement, and means for effecting relative movement of the rack and gear carriage transversely of the rack in a direction at an inclined angle to the rack teeth, substantially as and for the purpose specified.

3. In a gear lapping machine, the combination of a rack, a gear carriage constructed to rollably mount an unlapped gear in mesh with the rack and means for effecting relative movement of the rack and the gear carriage in two directions at an angle to each other, the teeth of the rack being arranged at inclined angles to the directions of both of such relative movements, substantially as and for the purpose set forth.

4. In a gear lapping machine, the combination of a rack, a gear carriage constructed to rollably mount an unlapped gear in mesh with the rack and means for effecting relative movement of such rack and the gear carriage in a direction lengthwise of the rack and at an inclined angle to the teeth of the rack, substantially as and for the purpose set forth.

5. In a gear lapping machine, the combination of a rack carriage, a rack thereon, a gear carriage constructed to rollably mount an unlapped gear in mesh with the rack, one of said carriages being movable in a direction lengthwise of the rack, the rack teeth extending at an inclined angle to such direction of movement and means for actuating the movable carriage, substantially as and for the purpose described.

6. In a gear lapping machine, the combination of a rack, a gear carriage constructed to rollably mount an unlapped gear in mesh with the rack and means for effecting relative movement of the rack and gear carriage in a direction crosswise of the rack and at an inclined angle to the teeth of the rack, substantially as and for the purpose specified.

7. In a gear lapping machine, the combination of a rack, a carriage constructed to rollably mount an unlapped gear mounted to move transversely of the rack in a direction at an inclined angle to the teeth of the rack with the gear in mesh with the rack, and means for moving the carriage, substantially as and for the purpose set forth.

8. In a gear lapping machine, the combination of a rack carriage having a rack thereon, a gear carriage constructed to rollably mount an unlapped gear in mesh with the rack, one of said carriages being movable in a direction lengthwise of the rack and one of said carriages being movable in the direction crosswise of the rack, the teeth of the rack being arranged at an inclined angle to such lengthwise and crosswise movements, and means for effecting said relative movements of the carriages substantially as and for the purpose specified.

9. In a gear lapping machine, the combination of a rack carriage, a rack thereon, a gear carriage arranged to support the gear in mesh with the rack, one of said carriages being movable in a direction lengthwise of the rack, the rack teeth extending at an inclined angle to such direction of movement and the gear carriage being reciprocally movable crosswise of the rack and means for effecting the relative movements of the carriages, substantially as and for the purpose described.

10. In a gear lapping machine, a frame, a rack carriage movable along the frame, a rack mounted on the carriage and having teeth inclined relatively to the direction of movement of the carriage, guides carried by the frame and extending crosswise of the rack, a gear carriage movable along the last-mentioned guides crosswise of the rack for guiding the gear in mesh with the rack, and means for actuating the carriages, substantially as and for the purpose specified.

11. In a gear lapping machine, a frame formed with guides, a rack carriage movable along the guides, a rack mounted on the carriage and arranged with its teeth extending at an inclined angle to the direction of movement of the rack carriage, the frame being also formed with guides arranged above the former guides and extending crosswise of the rack carriage and in a direction at an inclined angle to the teeth of the rack, a gear carriage movable along the last-mentioned guides and arranged to guide a gear in mesh with the rack, and means for actuating the carriages, substantially as and for the purpose set forth.

In testimony whereof, I have hereunto signed my name, at Syracuse, in the county of Onondaga, and State of New York, this 26th day of February, 1923.

GEORGE C. CARHART.